INVENTOR
WILLIAM B. RAY
BY Bauer and Witherspoon
ATTORNEYS

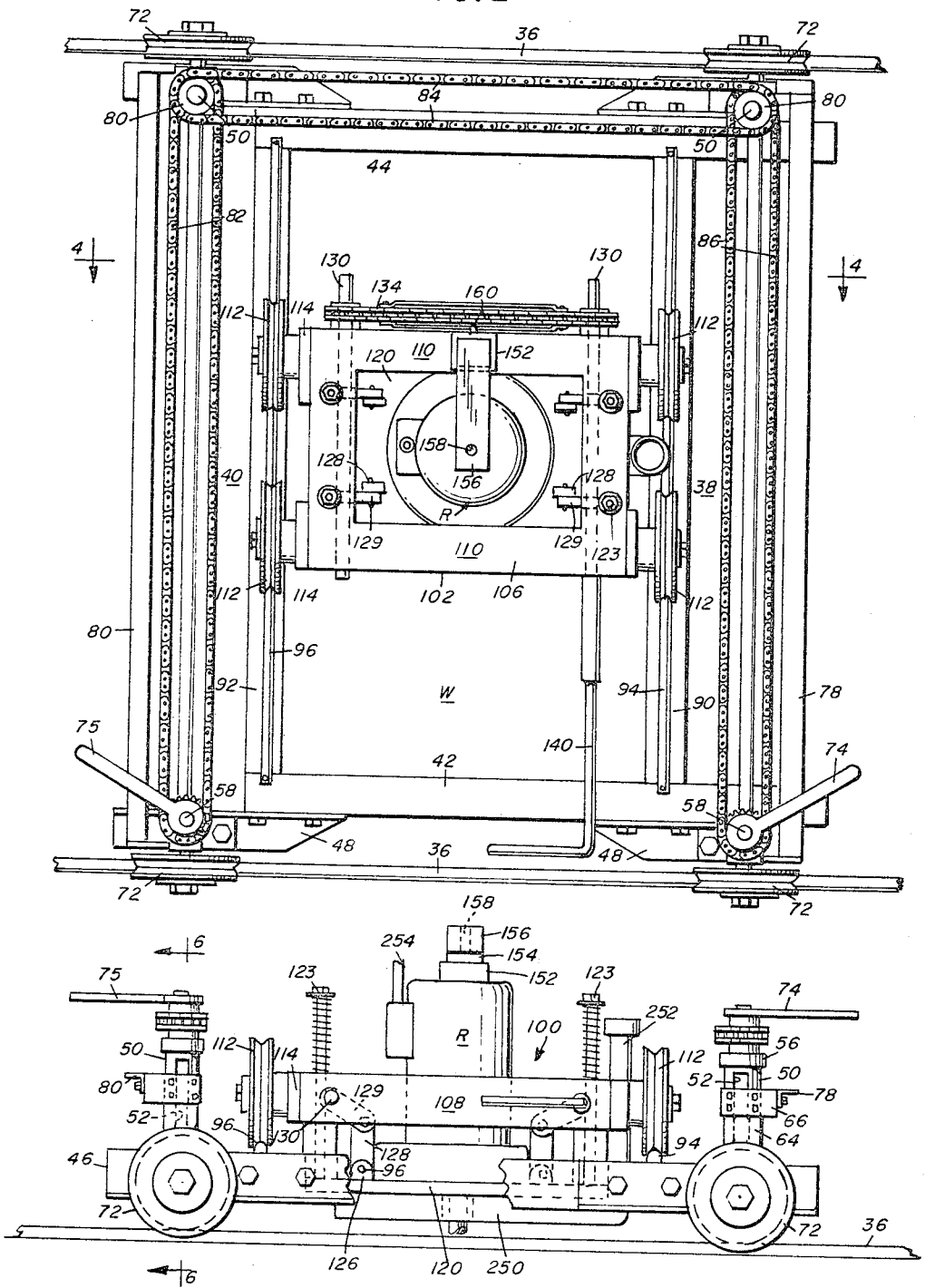

INVENTOR
WILLIAM B. RAY
BY *Bauyse and Witherspoon*
ATTORNEYS

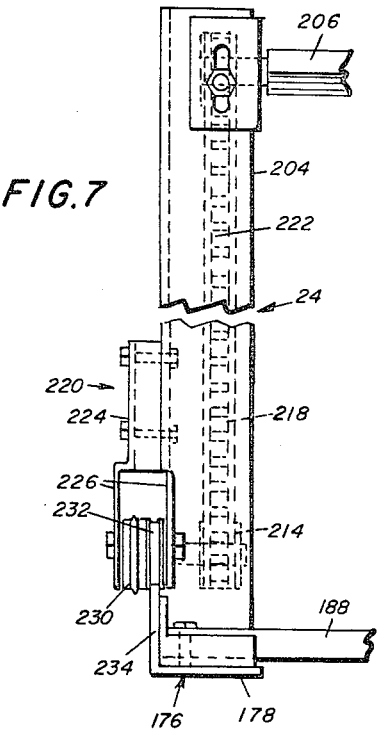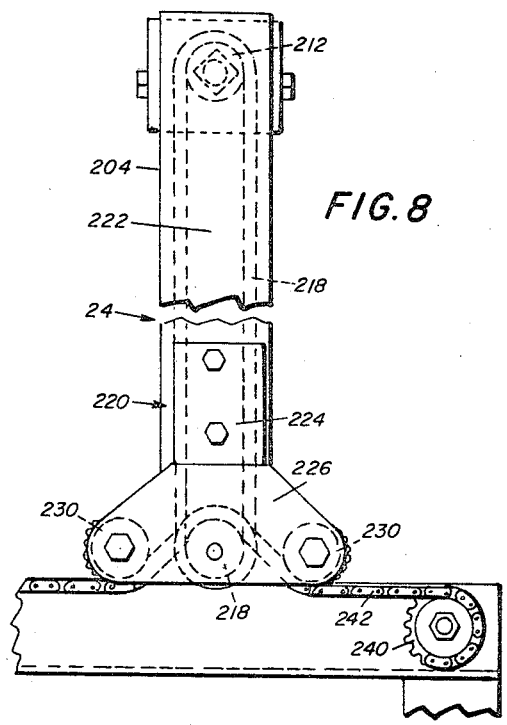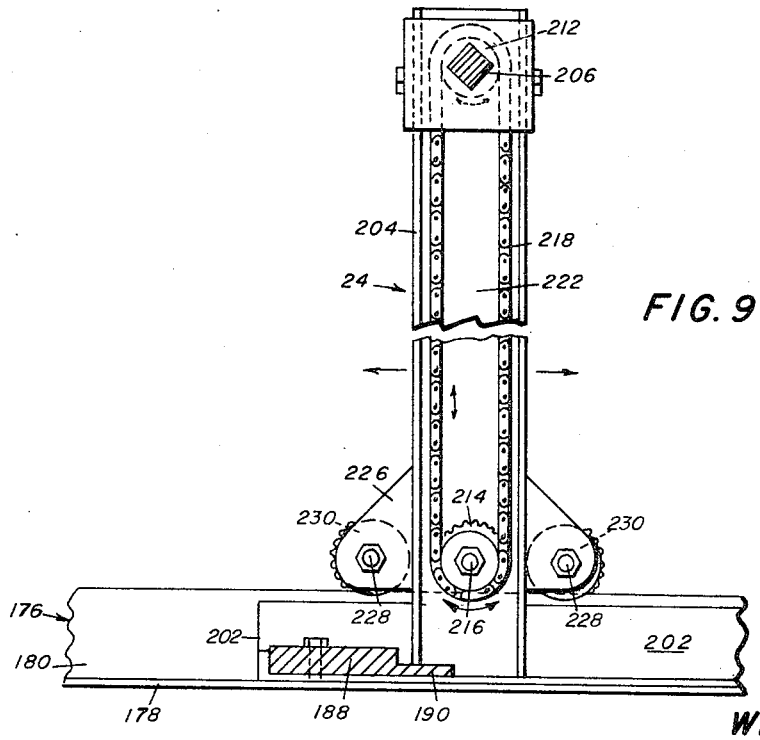

United States Patent Office 3,434,385
Patented Mar. 25, 1969

3,434,385
COMBINATION ROUTER CARRIAGE, WORK
HOLDER AND TEMPLATE HOLDER AND
ADJUSTER
William B. Ray, P.O. Box 524, Ocala, Fla. 32670
Filed Mar. 22, 1967, Ser. No. 625,161
Int. Cl. B23c 1/16; B23l 1/18; B27c 5/10
U.S. Cl. 90—13.1                               7 Claims

ABSTRACT OF THE DISCLOSURE

A combination router carriage, work holder and template holder and adjuster comprising a work holder having a base with means therein for receiving and holding the work in position. The router carriage has a main frame having vertically adjustable wheels which ride on tracks on the base to provide back and forth movement over the work positioned thereunder. The router is mounted on an upper frame having wheels riding on tracks on the main frame transverse to the base tracks. Means are provided for vertically adjusting the router on the upper frame. A template holder and adjuster is mounted on the base over the router carriage. The holder has means for retaining the template in lateral position while other means are provided to move the holder back and forth transversely of the base tracks. A guide pin is passed down through the template and engages the router carriage so that the router carriage may be traversed through the same path as that of the guide pin in the template to produce a corresponding design on the work.

Background of the invention

This invention relates to routing apparatus and more particularly a combination router carriage, work holder and template holder and adjuster wherein the work holder retains the work in fixed position beneath the router and the router is in turn directed by a guide pin which follows a path prescribed by the template holder and adjuster position over the router. It is generally well known to use a template to guide a router to produce a given design. The manner in which a router operates on the work makes it necessary to provide safe, accurate and easily used means for template work.

With the above in mind, it is an object of this invention to provide a combination router carriage, work holder and template holder and adjuster which is of simple and sturdy construction and yet economical to manufacture.

It is a further object to provide such a combination as above which is easy to use and simple to maintain.

It is another object to provide a combination as above wherein the router carriage provides universal movement for the router.

It is yet another object to provide a combination as set forth above wherein the template holder is readily adjustable so that the entire combination may have maximum adjustability.

Description of the drawings

In the drawings:

FIG. 2 is a top plan view of the universal router carriage;

FIG. 3 is an end elevational view of the carriage of FIG. 2;

FIG. 7 is a side elevational view of one end of the template holder moving mechanism;

FIG. 8 is an elevational view of the mechanism of FIG. 7 looking inwardly, and

FIG. 9 is an elevational view of the mechanism of FIG. 8 looking outwardly.

Description of a preferred embodiment

Figure 1:
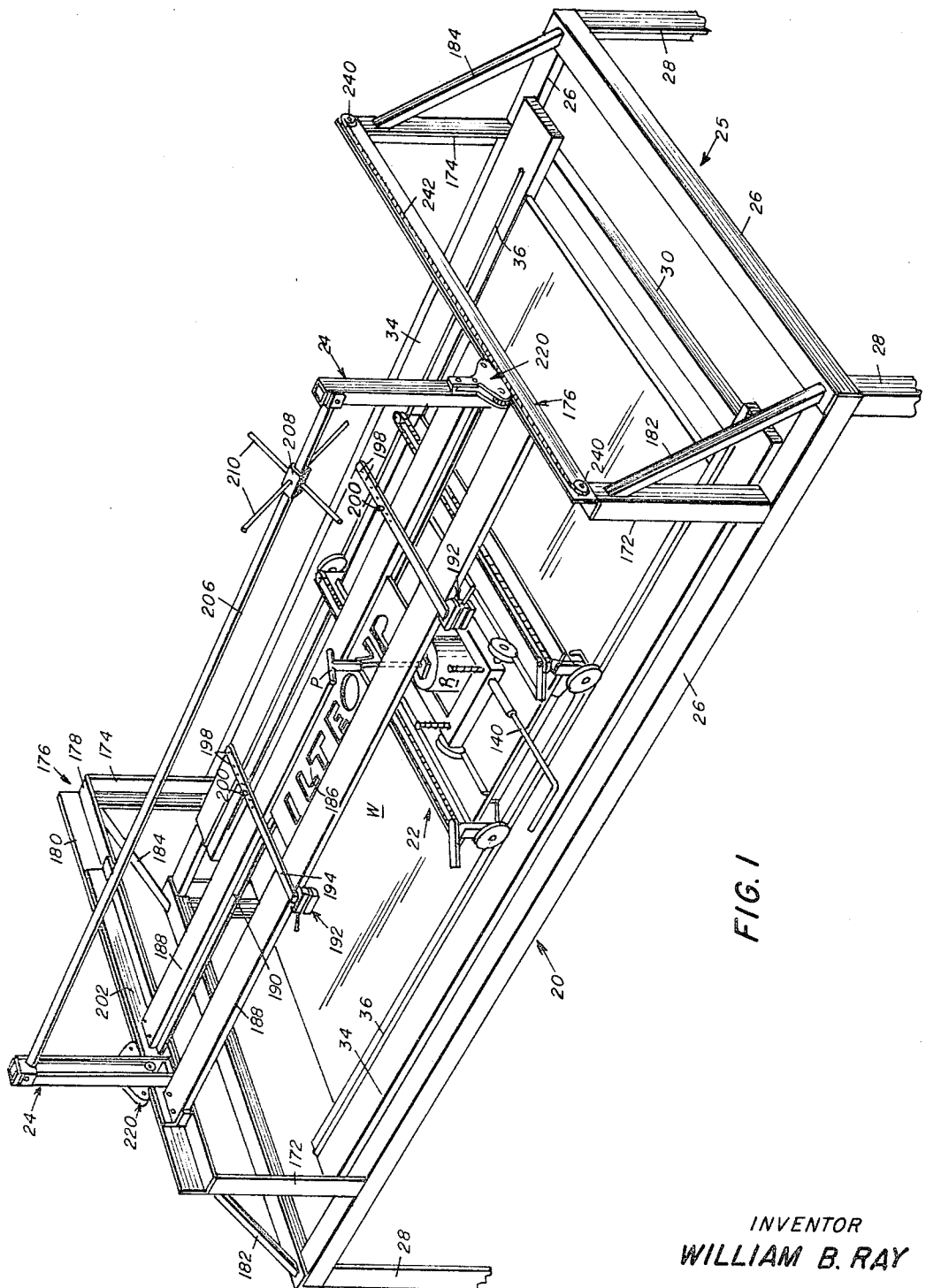
FIG. 1 is a perspective view of the combination router carriage, work holder and template holder and adjuster illustrating the manner in which the entire combination is assembled.

As best illustrated in FIG. 1, the routing apparatus of this invention comprises a base assembly 20, a universal router carriage 22 carried therein and a template holder and adjuster 24 mounted on the base 20. The base includes a rectangular frame 25 formed of angle irons 26 and supported by vertical legs 28. A plurality of cross members 30 are connected between longitudinal parallel sides of the frame 25 in parallel spaced relation to provide support for the work and other items to be carried by the base. A pair of longitudinal supports 34 are mounted on the cross members 30 adjacent each longitudinal angle iron 26. Each support carries a longitudinally disposed rail 36 on which the carriage assembly 22 reciprocates horizontally from one end to the other of the base.

Figure 6:
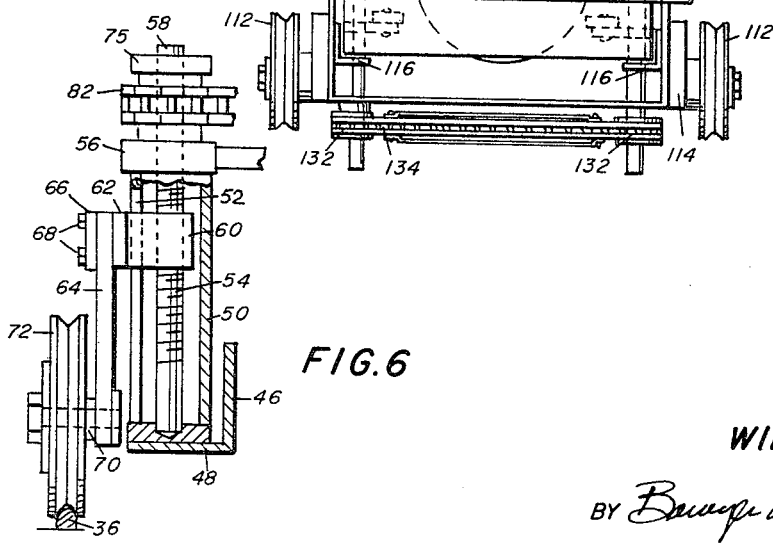
FIG. 6 is a cross sectional view taken along line 6—6 of FIG. 3 showing the threaded means used for elevating the main frame with respect to the work.

The universal carriage 22 which rides on rails 36, as best illustrated in FIG. 1-4, comprises a main rectangular frame including side members 38 and 40 and end members 42 and 44. An L-shaped bracket 46 is secured to the end portions of end members 42 and 44 with the lower portion 48 of the bracket 46 extending outwardly to form a supporting surface. This supporting surface mounts a vertically extending cylindrical bracket 50 (see FIG. 6) having a vertically and centrally positioned guide slot 52. A screw 54 is centrally and rotatably carried within the cylindrical bracket 50 with its lower end resting on the bottom of said bracket. The screw 54 extends upwardly through the top portion 56 of the guide bracket 50 and horizontally carries a sprocket 58. An elevating block 60 is threadedly mounted on screw 54 within the cylindrical guide bracket 50 and has a portion 62 extending outwardly through slot 52. A downwardly extending wheel axle support 64 and a bracket 66 are secured to block portion 62 by means of screws 68. The lower end portion support 64 mounts an axle 70 carrying wheel 72 which rolls on rail 36. Ratchet handle assemblies 74 and 75 are secured to the sprockets 58 on one side of the carriage 22. Cross braces 78 and 80 are secured to brackets 66 on both ends of the carriage to provide additional stability.

As illustrated in FIGS. 1-4, each of the four wheels 72 is mounted in the manner set forth above. It should be noted that on the side of the carriage opposite that carrying the ratchet handles 74, 75, each screw 50 mounts a second sprocket 81. Thus making it possible to interconnect all screws 50 by means of three endless chains 82, 84 and 86 so that by means of ratchet assemblies 74 and 75 all screws may be simultaneously rotated in the same direction to smoothly and evenly raise or lower the carriage frame. In actual practice, ratchet assembly 75 is set to rotate only in counterclockwise direction and ratchet assembly 74 is set only to rotate in clockwise direction, thus ratchet assembly 75 would raise carriage frame and ratchet assembly 74 would lower same.

The main carriage frame also mounts cross pieces 90 and 92 on which are secured main frame tracks 94 and 96 running transversely to rails 36—36 on the base 20. Upper carriage 100 is reciprocably mounted on main frame tracks 94 and 96.

As best shown in FIGS. 1–5, the upper carriage 100 comprises a rectangular frame 102 made up of four right angle irons 104 wherein the legs 108 and 106 of each angle iron face respectively downwardly and inwardly to provide a smooth upper surface 110. Wheels 112 are mounted on bearing blocks 114 on each corner of the frame 102 and ride on main frame tracks 94 and 96.

Figure 4:
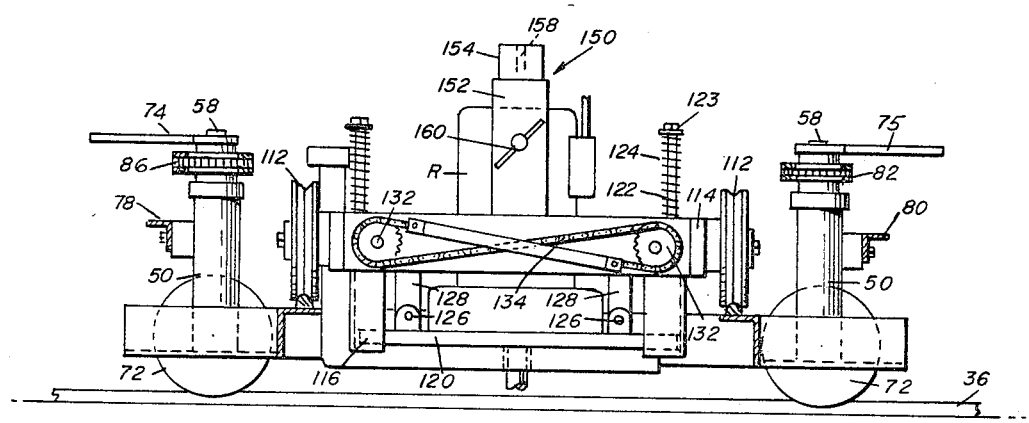
FIG. 4 is a cross sectional view taken along line 4—4 of FIG. 3.
Figure 5:
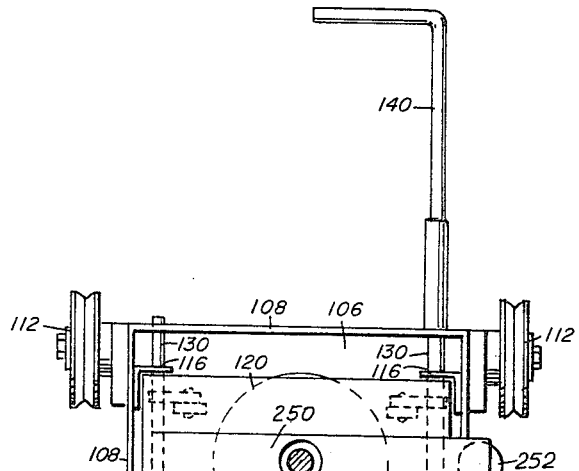
FIG. 5 is a bottom plan view of a portion of the carriage.

As illustrated in FIGS. 4 and 5, guides 116 in the form of right angle irons are secured to the legs 108 of angle irons 104 below the legs 106 adjacent to the frame corners to provide a guide for vertical displacement of the router mounting plate 120. It should be noted that these guides 116 extend down to a point almost even with the bottom of the main carriage frame (see FIG. 4). Mounting plate 120 is held in position by means of four vertical bolts 122 passing through the frame surface 110 and secured to mounting plate 120. Coil springs 124 are positioned around each bolt 122 between the bolt head 123 and frame surface 110, thereby resiliently carrying the mounting plate. Four upstanding lugs 126 are mounted on the upper face of mounting plate 120 adjacent the corners. The free end of each lug 126 pivotally carries a link 128 which is in turn pivotally secured to arm 129 rigidly secured to shafts 130, 130. Obviously rotation of shafts 130, 130 would raise and lower the mounting plate 120 through the linkage. In order to accomplish this, each shaft 130 is provided at the corresponding end with a sprocket 132 which sprockets are operatively connected by a crossed chain 134. In order to rotate one of the shafts 130, a handle 140 is connected thereto.

A vertically adjustable guide bracket assembly 150 is mounted on upper frame surface 110 as shown in FIG. 2 and FIG. 4. This assembly comprises a channel member 152 vertically mounted on upper frame surface 110 with an L-shaped channel member 154 having its leg slidably carried within channel 152 for vertical adjustment therein. The other leg 156 of L-shaped channel 154 extends horizontally inward so that it is generally centered over the center of the upper frame and the router R supported therein. Channel leg 156 has an aperture 158 generally aligned coaxially with the vertical axis of the router R. Locking means 160 is provided on channel 152 to lock channels 152 and 154 in adjusted vertical position.

As best shown in FIGS. 1, 7, 8 and 9, the template holding and adjusting assembly includes similar upright frame units on each end of the base 20. Each frame unit has a pair of vertical supports 172 and 174 secured to and extending upwardly from base side members 26—26. An L-shaped cross member 176 is connected therebetween with the base 178 of the cross member facing inwardly and the leg 180 projecting upwardly. Suitable angularly disposed braces 182 and 184 are positioned between supports 172 and 174 and base frame member 26 to provide necessary rigidity.

Template 186 is held in position between two longitudinally disposed jaws 188 each having a lip 190 on which the template rests. The jaws 188—188 are held in position with the template 186 therebetween by means of a pair of adjustable locking units 192—192. Each locking unit 192 comprises a generally parallel pair of arms 194 which are connected at one end by a pivotally mounted cam 196 carried between the arms 194. The free ends of the arms have aligned apertures 198 adapted to receive a pin 200 which acts as an adjustable stop. Thus with the two arms 194 straddling the jaws 188 and the pin 200 tightly against the adjacent edge of the jaw 188, rotation of cam 196 will bring the jaw lips 190 toward each other to firmly hold the template in position.

The jaws 188 are mounted on L-shaped supports 202 which conform in shape to cross members 176 and are slidably carried thereon. One of the jaws 188 is secured at both ends to the respective supports 202 while the other jaw is slidable thereon. In order to provide means for sliding the supports 202 along cross member 176, a U-shaped channel 204 is vertically mounted on each of the supports 202 as indicated in FIG. 9 with the channel opening facing inwardly. A square rod 206 is rotatably mounted between the upper ends of channels 204 (see FIG. 1). Rotation of rod 206 is made possible by means of a bushing 208 slidably carried on said end. A plurality of handle elements 210 project from bushing 208 to provide leverage.

Referring particularly to FIGS. 7–9, rod 206 mounts a sprocket 212 at each end thereof within the channels 204. A similar sprocket 214 is mounted near the bottom of each channel 204 on a shaft 216 and in alignment with sprocket 212. A loop chain 218 is fitted around sprockets 212 and 214 so as to impart rotation from rod 206 to shaft 216. Shaft 216 extends through channel 204 and mounts a driving sprocket 218. A bifurcated bracket assembly 220 is affixed to the closed outer face 222 of channel 204. This bracket assembly 220 has a main body portion 224 which is secured to outer face 222 of channel 204 and a pair of angularly depending shaft brackets 226 each mounting a shaft 228. An idler sprocket 230 and a wheel 232 are rotatably carried on each shaft 228, the wheels 232 being aligned so as to ride on the upper edge portion 234 of cross member 176 while sprockets 234 are aligned with driving sprocket 214.

As shown in FIG. 1, cross member 176 has an upstanding portion 180 having sprockets 240 fixedly mounted at each end thereof. A chain 242 is mounted between these sprockets 240 and passed under idler sprockets 230 and over driving sprocket 214 as illustrated in FIGS. 1, 8 and 9. Rotation of driving sprocket 214 thus causes the entire template holding and adjusting unit to traverse back and forth along cross member 176 in accordance with rotation of rod 206.

The router R is provided with a conventional suction assembly comprising a pick-up chamber 250 and exhaust pipe 252. Power is supplied to the router by way of power cord 254.

Operation of the apparatus should be fairly apparent in view of the preceding description, consequently the overall operation will be described only briefly.

First of all a workpiece generally designated W is positioned on the base 20 between longitudinal supports 34 and held therebetween by any suitable clamping means. Next, the template 186 is placed on the template holder between jaws 188 and their lips 190. The template is lined up laterally in the holder with respect to the work W therebeneath after which the two jaws 188 are firmly secured in such position to tightly engage the template 186 by means of a pair of locking units 192, each having a cam 196 which by rotation serves to firmly hold the two jaws in assembled position.

With the work W and the template 186 positioned in such manner, the template is adjusted transversely with respect to the rails 36—36 by means of handle 210 which rotates rod 206 thereby rotating sprocket 212 and sprocket 214 by means of connecting chain 218. Rotation of the driving sprocket 214 which engages sprocket chain 242 causes the holder assembly to move transversely with respect to the rails 36 depending upon the direction of rotation thereof. After the template 186 has been thus adjusted, a guide pin P is passed through the template opening and its end portion introduced into aperture 158 in guide bracket 156. Thus, movement of guide pin P through the various openings in the template will cause the router R to travel a corresponding path and thereby cut a like design in the work.

As previously described, the relative height of the carriage with respect to the rails 36 is controlled by rotation of ratchet assemblies 74 and 75 which through sprocket chains 82, 84 and 86 and their associated sprockets 58 and 80 rotate screws 54 and thereby vertically adjust guide blocks 60 to which the main frame wheels 72 are connected by means of intermediate brackets.

The router R is vertically adjusted with respect to the carriage by rotating shafts 130 which in turn mount fixed arms 129 connected to links 128 in turn secured to lugs 126 on the router mounting plate 120. Sprockets 132 on corresponding ends of shafts 130 are connected by a crossed chain 134 so that rotation of one shaft 130 by means of handle 140 will provide similar rotation to the other shaft and thereby smoothly raise or lower the router mounting plate 120.

With router carriage 22 and the template 186 both properly positioned, a portion of guide pin P is passed down through the opening in the template and engages guide bracket 150 by fitting down into aperture 158 in bracket portion 156. With the pin P so positioned the router R is traversed over the work W by means of movement of the pin through the template pattern to produce a corresponding pattern in the work W. It is apparent that since all adjustments are made through chain and sprocket and threaded connections there is sufficient inherent friction to maintain the setting. The universal movement of the router R is provided by means of main frame wheels 72 for longitudinal movement and upper frame wheels 112 for transverse movement. Such freedom of movement makes it very easy to control the path of the router R by means of guide pin P.

The combination universal router carriage, work holder and template holder and adjuster makes it possible to obtain maximum utility from a router since the mounting and guiding of a router are important factors in determining the quality of the work that can be accomplished by a router.

What is claimed is:

1. A combination universal router carriage, work holder and template holder and adjuster, said combination comprising a work holder having a base, means on said base for supporting and retaining the work in position and rail means longitudinally positioned on said base, a universal router carriage, having a main frame with four main frame wheels mounted thereon, means on said main frame for mounting and vertically adjusting said main frame wheels with respect to the main frame, said four main frame wheels riding on the aforesaid rail means to provide back and forth movement for the carriage therealong, main frame tracks on the main frame transverse to the rail means, said carriage having an upper frame mounting four wheels riding on the main frame tracks to provide movement of the upper frame transversely of the rail means, support means on said upper frame adapted to mount a router, means on the upper frame to vertically adjust the router with respect to the main frame, and upwardly extending guide bracket means mounted on the upper frame, a template holder and adjuster mounted on the base above the universal router carriage, said template holder and adjuster comprising end frame units mounted on and extending upwardly from the base, spaced and parallel tracks mounted on the frame units transverse to the base rail means, a holder having a relatively movable pair of jaws adapted to support and grip a template therebetween, wheels on said holder riding on said tracks to allow movement of the holder transversely to the base rail means, operating means on said holder to move same back and forth on said tracks, and guide pin means adapted to extend down through cutout portions of the template and be secured to the guide bracket means mounted on the upper frame whereby the entire universal router carriage and router may be freely moved in accordance with the template to cut a corresponding design in the work therebeneath.

2. The invention as set forth in claim 1 and wherein the means on said main frame for mounting and vertically adjusting said main frame wheels with respect to the main frame comprises a bracket mounted on the main frame for each wheel, a mounting block carried by each bracket, each block rotatably mounting a wheel, and means for vertically adjusting each block and wheel mounted thereon.

3. The invention as set forth in claim 2 and wherein the means for vertically adjusting each block and wheel mounted thereon comprises a screw threadedly connected to each block, and flexible driving means connecting all screws rotatively whereby rotation of one screw will cause all screws to rotate in the same direction and the same amount thereby providing an even vertical adjustment of the wheels with respect to the main frame.

4. The invention as set forth in claim 2 and wherein the support means on said upper frame adapted to mount a router comprises a mounting plate adapted to receive a router, and spring means for resiliently mounting said plate or the upper frame for vertical reciprocation.

5. The invention as set forth in claim 4 and wherein the means on said upper frame to vertically adjust the router with respect to the main frame comprises a pair of shafts parallelly mounted on the upper frame, linkage means connecting each shaft to the mounting plate, and means for rotating the shafts to selectively raise and lower the mounting plate.

6. The invention as set forth in claim 5 and wherein the means for rotating the shafts to selectively raise and lower the mounting plate comprises a sprocket on each shaft, and a chain connecting the sprockets so as to provide unified rotation of the shafts.

7. The invention as set forth in claim 6 and wherein the operating means on said template holder to move same back and forth on the tracks comprises a pair of vertical supports mounted on the holder, one adjacent each of the holder, rotatably mounted between and by said supports, handle means slidably mounted on the rod to rotate same, a sprocket chain mounted parallel to and adjacent each of the tracks, sprocket means on the holder interengaging the sprocket chain, means drivingly connecting the rotatable rod to the sprocket means whereby rotation of said rod will rotate the sprocket means and translate the holder on the tracks.

References Cited

UNITED STATES PATENTS

| 304,550 | 9/1884 | Palmer | 90—13 |
| 3,254,454 | 6/1966 | Cetrangolo | 90—13 |
| 3,357,308 | 12/1967 | Karfo | 90—13 |

GERALD A. DOST, *Primary Examiner.*

U.S. Cl. X.R.

144—144